United States Patent
Ortego, Jr. et al.

(10) Patent No.: US 7,071,239 B2
(45) Date of Patent: Jul. 4, 2006

(54) FISCHER-TROPSCH PROCESSES AND CATALYSTS USING STABILIZED SUPPORTS

(75) Inventors: J. Dale Ortego, Jr., Ponca City, OK (US); Kandaswamy Jothimurugesan, Ponca City, OK (US); Rafael L. Espinoza, Ponca City, OK (US); Kevin L. Coy, Ponca City, OK (US); Beatrice C. Ortego, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 14 days.

(21) Appl. No.: 10/687,022

(22) Filed: Oct. 16, 2003

(65) Prior Publication Data

US 2004/0132834 A1 Jul. 8, 2004

Related U.S. Application Data

(60) Provisional application No. 60/419,003, filed on Oct. 16, 2002.

(51) Int. Cl.
*C07C 27/00* (2006.01)

(52) U.S. Cl. ........................ 518/715; 700/713; 700/714; 700/715; 700/717; 700/719; 700/720; 700/721

(58) Field of Classification Search ................ 518/700, 518/713, 714, 715, 717, 719, 720, 721
See application file for complete search history.

(56) References Cited

U.S. PATENT DOCUMENTS

| | | | |
|---|---|---|---|
| 2,892,858 A | 6/1959 | Ziegler | |
| 3,852,190 A | 12/1974 | Buss et al. | |
| 3,894,963 A | 7/1975 | Gerdes et al. | 252/464 |
| 4,012,313 A | 3/1977 | Buss et al. | |
| 4,063,851 A | 12/1977 | Weldon | |
| 4,224,192 A | 9/1980 | Foster et al. | |
| 4,387,085 A | 6/1983 | Fanelli et al. | |
| 4,602,000 A | 7/1986 | Dupin et al. | 502/335 |
| 4,617,183 A | 10/1986 | Lewis et al. | |
| 4,708,945 A | 11/1987 | Murrell et al. | |
| 4,744,974 A | 5/1988 | Lewis et al. | |
| 4,831,007 A | 5/1989 | Murrell et al. | |
| 4,891,127 A | 1/1990 | Murrell et al. | |
| 5,055,019 A | 10/1991 | Meyer et al. | |
| 5,102,851 A | 4/1992 | Eri et al. | |
| 5,116,879 A | 5/1992 | Eri et al. | |
| 5,134,107 A | 7/1992 | Narula | |
| 5,232,580 A | 8/1993 | Le et al. | |
| 5,837,634 A | 11/1998 | McLaughlin et al. | |
| 5,874,381 A | 2/1999 | Bonne et al. | |
| 6,063,358 A | 5/2000 | Lindquist et al. | |
| 6,224,846 B1 | 5/2001 | Hurlburt et al. | |
| 6,255,358 B1 | 7/2001 | Singleton et al. | |
| 6,262,132 B1 | 7/2001 | Singleton et al. | |
| 6,271,432 B1 | 8/2001 | Singleton et al. | 585/700 |
| 6,303,531 B1 | 10/2001 | Lussier et al. | |
| 6,465,530 B1* | 10/2002 | Roy-Auberger et al. | 518/715 |
| 6,503,867 B1 | 1/2003 | Stamires et al. | 502/335 |
| 6,555,496 B1 | 4/2003 | Stamires et al. | 502/327 |
| 6,806,226 B1 | 10/2004 | Van Berge et al. | |
| 6,835,690 B1 | 12/2004 | Van Berge et al. | |
| 2001/0031793 A1* | 10/2001 | Singleton et al. | 518/715 |
| 2002/0155946 A1 | 10/2002 | Bogdan et al. | |
| 2003/0032554 A1 | 2/2003 | Park et al. | |
| 2003/0162849 A1 | 8/2003 | Van Berge et al. | |
| 2004/0186188 A1 | 9/2004 | Van Berge et al. | |

FOREIGN PATENT DOCUMENTS

| | | |
|---|---|---|
| GB | 640965 | 8/1950 |
| GB | 2 352 194 A | 1/2001 |
| WO | WO 99/42214 | 8/1999 |
| WO | WO 00/45948 | 8/2000 |
| WO | WO 01/76735 A1 | 10/2001 |
| WO | WO 01/87480 A1 | 11/2001 |
| WO | WO 02/07883 A2 | 1/2002 |
| WO | WO 03/012008 A2 | 2/2003 |
| ZA | 2001/6213 | 7/2001 |

OTHER PUBLICATIONS

Database CAPLUS on STN, Chemical Abstract (Columbus, Ohio, USA), AN 2000:795147. Van De Loosdrecht et al., *Support Modification for Cobalt Based Slurry Phase Fischer-Tropsch Catalysts*, American Chemical Society (2000), 220th, Fuel 048.

PCT International Search Report for International Application No. PCT/US03/32798, dated Apr. 18, 2004 (2 p.).

M. Absi-Halabi, et al.; "Studies on Pore Size Control of Alumina: Preparation of Alumina Catalyst Extrudates with Large Unimodal Pore Structure by Low Temperature Hydrothermal Treatment"; Preparation of Catalysts V, 1991 Elsevier Science Publishers B.V., Amsterdam, pp. 155-163.

(Continued)

*Primary Examiner*—J. Parsa
(74) *Attorney, Agent, or Firm*—Conley Rose P.C.

(57) ABSTRACT

A catalyst and method for producing hydrocarbons using a catalyst support having an improved hydrothermal stability, such as under Fischer-Tropsch synthesis conditions. The stabilized support is made by a method comprising treating a boehmite material in contact with at least one structural stabilizer. Contacting the boehmite with at least one structural stabilizer can include forming a mixture comprising the boehmite material and at the least one structural stabilizer. The mixture can be a sol or a slurry. The treating preferably includes drying or spray drying the mixture, and calcining in an oxidizing atmosphere to obtain the stabilized support. Preferred structural stabilizers can include an element, such as cobalt, magnesium, zirconium, boron, aluminum, barium, silicon, lanthanum, oxides thereof, or combinations thereof; or can include precipitated oxides, such as a co-precipitated silica-alumina.

77 Claims, 1 Drawing Sheet

OTHER PUBLICATIONS

Condea; "High purity activated aluminas PURALOX, CATALOX"; Product Information Sheet Oct. 1999; 6 pages.

Rong-Sheng Zhou, et al.; "Structures and Transformation Mechanisms of the η. γ and θ Transition Aluminas"; International Union of Crystallography 1991; Institute for Ceraminc Superconductivity, New York State College of Ceramics, Alfred University, Alfred, NY 14802, USA: pp. 617-630.

Richard L. Smith, et al.; "The Influence of Diaspore Seeding and Chlordie Concentration on the Transformation of 'Diasporic' Precursors to Corundum"; Journal of the American Ceramic Society, Oct. 16, 2000; 31 pages.

H.C. Stumpf, et al.; "Thermal Transformations of Aluminas and Alumina Hydrates"; Industrial and Engineering Chemistry, vol. 42, No. 7, Jul. 1950; pp. 1398-1403.

Shu-Hui Cai, et al.; "Atomic Scale Mechanism of the Transformation of γ-Alumina to θ-Alumina"; The American Physical Society 2002; Physical Review Letters, vol. 89, No. 23; Dec. 2, 2002; 4 pages.

Zhong-Wen Liu, et al.; "Partial Oxidation of Methane Over Nickel Catalysts Supported on Various Aluminas"; Korean J. Chem. Eng., vol. 19, No. 5, pp. 735-741 (2002).

Hyun-Seog Roh, et al.; "Partial Oxidation of Methane Over Ni/θ-$Al_2O_3$"; Chemistry Letters 2001; Mar. 19, 2001; pp. 666-667.

Hyun-Seog Roh, et al.; "Partial Oxidation of Methane Over Ni/Ce-$ZrO_2$/B-$Al_2O_3$"; Korean J. CHem. Eng., vol. 19, No. 5; pp. 742-748 (2002).

Hiromichi Arai, et al.; "Thermal stabilization of catalysts supports and their application to high-temperature catalytic combustion"; Applied Catalysis A: General 138 (1996); pp. 161-176; Elsevier Science Publishers B.V., Amsterdam.

Bernard Beguin et al.; "Stabilization of alumina by addition of lanthanum"; Applied Catalysis A: General 138 (1996); pp. 161-176; Elsevier Science Publishers B.V., Amsterdam.

François Oudet, et al.; "Thermal Stabilization of Transition Alumina by Structural Coherence with $LnAlO_3$ (Ln=La, Pr, Nd)"; Journal of Catalysts vol. 114; pp. 112-120 (1988).

H. Schaper, et al.; "The Influence of Lanthanum Oxide on the Thermal Stability of Gamma Alumina Catalyst Supports"; Applied Catalysis, vol. 7 (1983), pp. 211-220; Elsevier Science Publishers B.V., Amsterdam.

Jalajakumari Nair, et al.; "Pore Structure Evolution of Lanthana-Alumina Systems Prepared Through Coprecipitation"; J. Am Ceram. Soc:, vol. 83, No. 8; pp. 1942-1946 (2000).

Hennie Schaper, et al.; "Thermal Stabilization of High Surface Area Lumina"; Solid State Ionics, vol. 16 (1985), pp. 261-266.

Xiaoyin Chen, et al.; "High temperature stabilization of alumina modified b lanthanum species"; Applied Catalysis A: General, vol. 205 (2001); pp. 159-172.

S. Subramanian, et al.; "Characterization of lanthana/alumina composite oxides"; Journal of Molecular Catalysis, vol. 69 (1991); pp. 235-245.

P. Souza Santos, et al.; "Standard Transition Aluminas. Electron Microscopy Studies"; Materials Research, vol. 3, No. 4; pp. 104-114, 2000.

E. Iglesia, et al.; "Computer-Aided Design of Catalysts," ed. E.R. Becker et al., p. 215-225, New York, Marcel Decker, Inc., 1993.

H. Pham, et al.; "The synthesis of attrition resistant slurry phase iron Fischer-Tropsch catalysts," Catalysis Today, vol. 58 (2000), pp. 233-240.

* cited by examiner

FISCHER-TROPSCH PROCESSES AND CATALYSTS USING STABILIZED SUPPORTS

CROSS-REFERENCE TO RELATED APPLICATIONS

This non-provisional application claims the benefit of U.S. Provisional Application No. 60/419,003, filed Oct. 16, 2002, which is hereby incorporated by reference in its entirety.

FIELD OF THE INVENTION

The present invention relates to a catalyst that includes a stabilized support and a catalytic metal and more specifically to a stabilized support derived by treating a boehmite material in the presence of a structural stabilizer to enhance hydrothermal stability.

BACKGROUND OF THE INVENTION

Natural gas, found in deposits in the earth, is an abundant energy resource. For example, natural gas commonly serves as a fuel for heating, cooking, and power generation, among other things. The process of obtaining natural gas from an earth formation typically includes drilling a well into the formation. Wells that provide natural gas are often remote from locations with a demand for the consumption of the natural gas.

Thus, natural gas is conventionally transported large distances from the wellhead to commercial destinations in pipelines. This transportation presents technological challenges due in part to the large volume occupied by a gas. Because the volume of a gas is so much greater than the volume of a liquid containing the same number of gas molecules, the process of transporting natural gas typically includes chilling and/or pressurizing the natural gas in order to liquefy it. However, this contributes to the final cost of the natural gas.

Further, naturally occurring sources of crude oil used for liquid fuels such as gasoline and middle distillates have been decreasing and supplies are not expected to meet demand in the coming years. Middle distillates typically include heating oil, jet fuel, diesel fuel, and kerosene. Fuels that are liquid under standard atmospheric conditions have the advantage that in addition to their value, they can be transported more easily in a pipeline than natural gas, since they do not require energy, equipment, and expense required for liquefaction.

Thus, for all of the above-described reasons, there has been interest in developing technologies for converting natural gas to more readily transportable liquid fuels, i.e. to fuels that are liquid at standard temperatures and pressures. One method for converting natural gas to liquid fuels involves two sequential chemical transformations. In the first transformation, natural gas or methane, the major chemical component of natural gas, is reacted with oxygen to form syngas, which is a combination of carbon monoxide gas and hydrogen gas. In the second transformation, known as the Fischer-Tropsch process, carbon monoxide is converted into organic molecules containing carbon and hydrogen. Those organic molecules containing only carbon and hydrogen are known as hydrocarbons. In addition, other organic molecules containing oxygen in addition to carbon and hydrogen known as oxygenates may be formed during the Fischer-Tropsch process. Hydrocarbons having carbons linked in a straight chain are known as aliphatic hydrocarbons that may include paraffins and/or olefins. Paraffins are particularly desirable as the basis of synthetic diesel fuel.

The Fischer-Tropsch process is commonly facilitated by a catalyst. Catalysts desirably have the function of increasing the rate of a reaction without being consumed by the reaction. A feed containing carbon monoxide and hydrogen is typically contacted with a catalyst in a reactor.

Typically, the Fischer-Tropsch product stream contains hydrocarbons having a range of numbers of carbon atoms, and thus having a range of molecular weights. Therefore, the Fischer-Tropsch products produced by conversion of natural gas commonly contain a range of hydrocarbons including gases, liquids and waxes. Depending on the product molecular weight distribution, different Fischer-Tropsch product mixtures are ideally suited to different uses. For example, Fischer-Tropsch product mixtures containing liquids may be processed to yield gasoline, as well as middle distillates. Hydrocarbon waxes may be subjected to an additional processing step for conversion to liquid and/or gaseous hydrocarbons. Consequently, in the production of a Fischer-Tropsch product stream for processing to a fuel, it is desirable to maximize the production of high value liquid hydrocarbons, such as hydrocarbons with at least 5 carbon atoms per hydrocarbon molecule ($C_{5+}$ hydrocarbons).

Typically, in the Fischer-Tropsch synthesis, the product spectra can be described by likening the Fischer-Tropsch reaction to a polymerization reaction with a Shultz-Flory chain growth probability, called alpha value ($\alpha$), that is independent of the number of carbon atoms in the lengthening molecule. The alpha value is typically interpreted as the ratio of the mole fraction of the $C_{n+1}$ product to the mole fraction of the $C_n$ product. An alpha value of at least 0.72 is desirable for producing high carbon-length hydrocarbons, such as those of diesel fractions.

The composition of a catalyst influences the relative amounts of hydrocarbons obtained from a Fischer-Tropsch catalytic process. Common catalysts for use in the Fischer-Tropsch process contain at least one metal from Groups 8, 9, or 10 of the Periodic Table (in the new IUPAC notation, which is used throughout the present specification).

Cobalt metal is particularly desirable in catalysts used in converting natural gas to heavy hydrocarbons suitable for the production of diesel fuel. Alternatively, iron, nickel, and ruthenium have been used in Fischer-Tropsch catalysts. Nickel catalysts favor termination and are useful for aiding the selective production of methane from syngas. Iron has the advantage of being readily available and relatively inexpensive but has the disadvantage of a water-gas shift activity. Ruthenium has the advantage of high activity but is quite expensive.

Catalysts often further employ a promoter in conjunction with the principal catalytic metal. A promoter typically improves a measure of the performance of a catalyst, such as activity, stability, selectivity, reducibility, or regenerability.

Further, in addition to the catalytic metal, a Fischer-Tropsch catalyst often includes a support material. The support is typically a porous material that provides mechanical strength and a high surface area, in which the active metal and promoter(s) can be deposited. In a common method of loading a Fischer-Tropsch metal to a support, the support is impregnated with a solution containing a dissolved metal-containing compound. The metal may be impregnated in a single impregnation, drying and calcination step or in multiple steps. When a promoter is used, an impregnation solution may further contain a promoter-containing compound. After drying the support, the resulting catalyst precursor is calcined, typically by heating in an oxidizing atmosphere, to decompose the metal-containing compound to a metal oxide. When the catalytic metal is cobalt, the catalyst precursor is then typically reduced in hydrogen to convert the oxide compound to reduced "metallic" metal. When the catalyst includes a promoter, the reduction conditions may cause reduction of the promoter, or the promoter may remain as an oxide compound.

Catalyst supports for catalysts used in Fischer-Tropsch synthesis of hydrocarbons have typically been refractory oxides (e.g., silica, alumina, titania, zirconia or mixtures thereof). It has been asserted that the Fischer-Tropsch synthesis reaction is only weakly dependent on the chemical identity of the metal oxide support (see E. Iglesia et al. 1993, In: "Computer-Aided Design of Catalysts," ed. E. R. Becker et al., p. 215, New York, Marcel Dekker, Inc.). Nevertheless, because it continues to be desirable to improve the performance of Fischer-Tropsch catalysts, other types of catalyst supports are being investigated.

In particular, various aluminum oxide compounds have been investigated. For example, gamma-alumina is an oxide compound of aluminum having, in its pure form, the empirical formula $\gamma\text{-}Al_2O_3$. Gamma-alumina distinguished from other polymorphic forms of alumina, such as alpha-alumina ($\alpha\text{-}Al_2O_3$), by its structure, which may be detected for example by x-ray diffraction (see for example Zhou & Snyder, 1991, Acta Cryst., vol B47, pp 617–630) or electron microscopy (see for example Santos et al., 2000, Materials Research, vol 3, No.4, pp 101–114). The structure of gamma-alumina is conventionally thought to approximate a spinel with a cubic form or a tetragonal form or combination.

In a common method of producing gamma-alumina, naturally occurring bauxite is transformed to gamma-alumina via intermediates. Bauxite is an ore, which is obtained from the earth's crust. Minerals commonly found in bauxite and the empirical formulas of their pure forms include gibbsite ($\alpha\text{-}Al_2O_3.3H_2O$), boehmite ($\alpha\text{-}Al_2O_3.H_2O$), diaspore ($\beta\text{-}Al_2O_3.H_2O$), hematite ($\alpha\text{-}Fe_2O_3$), goethite ($\alpha\text{-}FeOOH$), magnetite ($Fe_3O_4$), siderite ($FeCO_3$), ilmenite ($FeTiO_3$), anatase ($TiO_2$), rutile ($TiO_2$), brookite ($TiO_2$), hallyosite ($Al_2O_3 \ 2SiO_2.3H_2O$), kaolinite ($Al_2O_3 \ 2SiO_2.2H_2O$), and quartz ($SiO_2$).

In a first transformation, gibbsite is derived from bauxite. The Bayer process is one common process for producing gibbsite from bauxite. The Bayer process was originally developed by Karl Joseph Bayer in 1888 and is the basis of most commercial processes for the production of gibbsite. As it is conventionally carried out, the Bayer process includes digestion of bauxite with sodium hydroxide in solution at elevated temperature and pressure to form sodium aluminate in solution, separation of insoluble impurities from the solution, and precipitation of gibbsite from the solution.

In a second transformation, boehmite is derived from gibbsite. As disclosed above, gibbsite is a trihydrated alumina having, in its pure form, the empirical formula $\alpha\text{-}Al_2O_3.3H_2O$. Transformation of gibbsite to boehmite may be accomplished by varying the conditions so as to influence the thermodynamic equilibrium to favor boehmite. For example, a method for producing boehmite from gibbsite may include dehydration in air at 180° C.

In a third transformation, gamma-alumina is derived from boehmite. Boehmite, in its pure form has the empirical formula $\alpha\text{-}Al_2O_3.H_2O$. Alternately, it is denoted in the art by $\gamma\text{-}AlO(OH)$. The respective $\alpha$ and $\gamma$ prefixes refer to the crystalline form. Boehmite is distinguished from other polymorphic forms of monohydrated alumina, such as diaspore ($\beta\text{-}Al_2O_3.H_2O$), by its structure or crystalline form. In particular, boehmite typically has orthorhombic symmetry. Transformation of boehmite to gamma-alumina may be accomplished by varying the conditions so as to influence the thermodynamic equilibrium to favor gamma-alumina.

A support material is desirably stable. Under ambient (standard) conditions of temperature and pressure, such as for storage, gamma-alumina is less reactive and therefore more stable than boehmite. Thus, gamma-alumina is typically regarded as a more desirable support material than boehmite. Further, calcination of boehmite to form gamma-alumina before loading catalytic metal to the gamma-alumina is generally regarded as a desirable step in the formation of a catalyst from boehmite. Therefore, catalytic metal is typically not loaded to boehmite itself in forming a catalyst.

Despite the tendency of gamma-alumina to be stable at atmospheric conditions, gamma-alumina is known to exhibit a tendency to instability under hydrothermal conditions. For example, M. Abso-Haalabi, et al. in "Preparation of Catalysts V", Ed. G. Poncelet, et al. (1991, Elsevier, Amsterdam, pp. 155–163) disclose that gamma-alumina undergoes an increase in average pore size and an accompanying decrease in surface area after hydrothermal treatment in the temperature range 150–300° C. Such a transformation would be undesirable in a catalyst. However, similar hydrothermal conditions occur, for example, in the Fischer-Tropsch process. In particular, in a Fischer-Tropsch process, water is produced during the Fischer-Tropsch reaction. The presence of water together with the elevated temperatures conventionally employed in the Fischer-Tropsch process create conditions in which hydrothermal stability, which is stability at elevated temperatures in the presence of water, is desirable. Fischer-Tropsch catalysts using gamma-alumina supports are known to exhibit a tendency to hydrothermal instability under Fischer-Tropsch operating conditions. This instability tends to cause a decrease in performance of gamma-alumina supported catalysts.

Consequently, there is a need for an improved support for a Fischer-Tropsch catalyst. Further needs include a Fischer-Tropsch catalyst that is hydrothermally stable under Fischer-Tropsch operating conditions. Additional needs include a catalyst that does not tend to decrease in performance under Fischer-Tropsch operating conditions.

SUMMARY OF THE INVENTION

According to a preferred embodiment of the present invention, a catalyst features a stabilized support and a Fischer-Tropsch catalytic metal. The stabilized support can be made by a method that includes treating boehmite in contact with a structural stabilizer. Contacting the boehmite with the structural stabilizer preferably includes forming a mixture comprising a boehmite material and a compound of the structural stabilizer in a solvent. The mixture can be a sol or a slurry. The treating preferably enhances the hydrothermal stability of the support. Treating preferably includes drying the suspension and/or calcining.

According to preferred embodiments, contacting the boehmite with the structural stabilizer preferably includes forming a mixture (preferably a sol) comprising a boehmite material and a compound of the structural stabilizer. More than one structural stabilizer or more than one compound of a structural stabilizer can be added to the mixture. Forming the mixture can comprise dispersing the boehmite material in a solvent to form the sol and adding a compound of the structural stabilizer to the sol or can comprise dispersing a compound of the structural stabilizer in a solvent to form a sol and adding the boehmite material to the sol. In other embodiments, forming the mixture can include dispersing the boehmite material in a first solvent to form a first sol; dispersing a compound of at least one structural stabilizer in a second solvent to form a second sol, a slurry or a solution; and combining the first sol with the second sol, slurry or solution.

According to yet another embodiment, contacting the boehmite with the structural stabilizer preferably includes forming a mixture by mixing a boehmite sol and a gel containing at least one structural stabilizer. The gel preferably comprises precipitated alumina, silica, titania, zirconia, magnesia, boria, ceria, thoria, or combinations thereof. More preferably, the gel comprises a co-precipitated silica-alumina gel.

According to some embodiments, the treating includes drying the mixture (sol or slurry) in a conventional oven or in a spray drier.

According to some other embodiments, the method includes dispersing the boehmite so as to form a sol, drying the sol to form a dried boehmite, and depositing the structural stabilizer to the dried boehmite, wherein drying includes drying in a conventional oven and/or spray drying.

According to some embodiments, the treating also includes calcining the boehmite and the structural stabilizer in an oxidizing atmosphere.

According to some embodiments, the stabilized support preferably includes the structural stabilizer.

Suitable structural stabilizers comprise tungsten (W), tantalum (Ta), niobium (Nb), thorium (Th), germanium (Ge), uranium (U), tin (Sn), antimony (Sb), vanadium (V), halfnium (Hf), sodium (Na), potassium (K), boron (B), aluminum (Al), magnesium (Mg), silicon (Si), calcium (Ca), titanium (Ti), chromium (Cr), manganese (Mn), iron (Fe), cobalt (Co), nickel (Ni), copper (Cu), zinc (Zn), gallium (Ga), strontium (Sr), zirconium (Zr), barium (Ba), thorium (Th), and the lanthanides, including lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), and combinations thereof. The structural stabilizers can comprise oxides of these elements. The structural stabilizer preferably comprises at least one element selected from the group consisting of cobalt, magnesium, zirconium, boron, aluminum, barium, silicon, lanthanum, oxides thereof, and any combination thereof.

One advantage of the present catalyst is improved stability in the presence of water vapor. This improved hydrothermal stability conveys a better conservation of surface area, pore volume, and/or pore size of the catalyst when the catalyst is exposed to high water vapor partial pressure.

According to another embodiment of the present invention, a process for producing hydrocarbons includes contacting a catalyst that includes a stabilized support with a feed stream including carbon monoxide and hydrogen so as to produce hydrocarbons.

An advantage of the present catalyst is improved stability under Fischer-Tropsch reaction conditions. This improved stability can be determined by one or any combination of measurements such as selectivity, conversion, overall productivity, lifetime, and product yield.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawing in which the drawing illustrates the hydrothermal stability of non-stable and stable supports.

DETAILED DESCRIPTION OF THE PREFERRED EMBODIMENT

Catalyst Support

According to a preferred embodiment of the present invention, an effective catalyst includes a stabilized support that includes a structural stabilizer. The structural stabilizer can be any material that when added to the support is capable of increasing the robustness of the catalyst under reaction conditions. The robustness can be exhibited, for example, as mechanical strength, attrition resistance, hydrothermal stability, and the like.

Suitable structural stabilizers include tungsten (W), tantalum (Ta), niobium (Nb), thorium (Th), germanium (Ge), uranium (U), tin (Sn), antimony (Sb), vanadium (V), halfnium (Hf), sodium (Na), potassium (K), boron (B), aluminum (Al), magnesium (Mg), silicon (Si), calcium (Ca), titanium (Ti), chromium (Cr), manganese (Mn), iron (Fe), cobalt (Co), nickel (Ni), copper (Cu), zinc (Zn), gallium (Ga), strontium (Sr), zirconium (Zr), barium (Ba), thorium (Th), and the lanthanides, including lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu), oxides thereof, and combinations thereof. The structural stabilizer preferably comprises at least one element selected from the group consisting of cobalt, magnesium, zirconium, boron, aluminum, barium, silicon, lanthanum, oxides thereof, and any combination thereof. More preferably, the structural stabilizer comprises at least one element selected from the group consisting of cobalt, magnesium, zirconium, boron, barium, silicon, lanthanum, oxides thereof, and any combination thereof. In some embodiments, the structural stabilizer may include one or more oxides of these elements.

An alternate embodiment comprises the use of at least two elements in the structural stabilizer, with one element having more acidity than the other(s). It is envisioned that adding a small amount of acidic sites, preferably well-dispersed acidic sites, within the stabilized support structure may be particularly desirable for the making of the catalyst. Without limiting the invention and as an example of such an alternate embodiment, the structural stabilizer can comprise a mixture of inorganic oxides, such as silica, alumina, titania, zirconia, magnesia, boria, ceria, thoria, and combinations thereof. Preferably, the structural stabilizer comprises a silica-alumina material with a molar ratio of silica to alumina between about 1:1 and about 500:1, more preferably between about 3:1 and about 500:1. In a preferred embodiment, the silica-alumina material comprises co-precipitated silica-alumina.

The stabilized support should have between about 0.5 weight percent and about 20 weight percent (wt %) of the structural stabilizer in the total support weight, preferably between about 1 wt % and about 10 wt % of the structural stabilizer in the total support weight, and more preferably between about 1 wt % and about 8 wt % of the structural stabilizer in the total support weight.

The stabilized support is preferably porous. The average pore size is preferably larger than about 4 nm, more preferably between about 4 nm and about 20 nm. The average surface area, including the surface of the pores, is preferably larger than 30 square meters per gram of support ($m^2/g$ support), more preferably between about 50 $m^2/g$ support and about 250 $m^2/g$ support. When the stabilized support is in the form of particles, the particles preferably have a size between about 10 microns and about 200 microns when the catalyst is intended for use in a slurry bed reactor or fluidized bed reactor. The average size of the particles is preferably between about 50 microns and about 90 microns. Alternatively, particles of the stabilized support preferably have a size greater than 0.5 mm, more preferably greater than 1 mm, when the catalyst is intended for use in a fixed bed reactor. Each particle may include a plurality of crystallites. The crystallites preferably have an average size between about 10 nm and about 40 nm.

The stabilized support is preferably non-dispersible in water or an aqueous solution, wherein said aqueous solution can comprise an active metal compound. It is believed by the present inventors that the present stabilized support is non-dispersible. In some embodiments, the present inventors believe that the stabilized support can also be non-dispersible in acidic solution.

Support Preparation

The stabilized support can be made by a method that includes treating boehmite in contact with a structural stabilizer.

The boehmite is preferably derived as synthetic boehmite. Synthetic boehmite includes any boehmite not derived from ore. When the boehmite is synthetic boehmite, the synthetic boehmite can be made by any suitable process. For example, synthetic boehmite can be made by a gellation method. In particular, maturation of an $Al(OH)_3$ gel at pH>12 and 80° C. produces synthetic boehmite.

In alternative embodiments, the boehmite can be derived as natural boehmite. Minor variations, such as in impurities, may exist between various commercial sources of natural boehmite. Exemplary impurities include, for example, elements or compounds derived from other materials contained in natural sources of boehmite. Thus, natural boehmite may include minor amounts of any one or combination of iron, titanium, and silicon. However, it is believed by the present inventors that any conventional natural boehmite is suitable.

According to some embodiments, the boehmite can be spray-dried boehmite. Alternatively, the boehmite can be extruded boehmite.

The boehmite can be obtained as commercial boehmite. Commercial spray dried boehmite is typically available as a powder having a specified particle size. It will be appreciated that for powders obtained with particle sizes outside a desired range, the average particle size can be adjusted by spray drying a sol containing the boehmite so as to form the support material, for example as disclosed herein.

The boehmite may be dispersible or substantially non-dispersible in water or an aqueous solution.

By way of example and not limitation, suitable commercial boehmites include boehmites under the registered trademarks Dispal® and Disperal® from Sasol North America Inc. (Houston, Tex.) and boehmites under the registered trademark Hi Q® from Alcoa (Houston, Tex.).

In some embodiments, the boehmite is dispersible in acid. The acid-dispersible boehmite can be a commercial acid-dispersible boehmite. It is believed by the Applicants that the acid dispersibility confers to the support a greater stability towards the presence of water, especially of steam.

The boehmite material can be pre-treated prior to contacting the boehmite material with the structural stabilizer and treating. The pore size distribution of the boehmite material can be modified to achieve a desired range by preheating the boehmite at a temperature below the temperature of phase transformation from boehmite (aluminum monohydroxide) to an aluminum oxide structure. When the boehmite is in the form of a powder, the particle size range can also be adjusted to a desirable range. The particle size distribution can be modified, for example, by suspending the boehmite in a solvent, spray-drying the suspension of boehmite, and drying the spray-dried boehmite. The solvent is preferably water for a substantially dispersible boehmite or a non-aqueous solvent for a substantially non-dispersible boehmite. The spray-dried boehmite preferably has a particle size range of from about 20 microns to about 200 microns. Accordingly, the pre-treatment can comprise spray-drying of a suspension of the boehmite support material, preheating of the boehmite support material, or combinations thereof. When the boehmite support material is pre-treated by spray-drying and preheating, the spray-drying step is preferably performed before the preheating step.

Preheating comprises calcining the support material comprising boehmite in an atmosphere to a temperature preferably ranging from about 250° C. to about 350° C., more preferably from about 300° C. to about 350° C., and most preferably from about 315° C. to about 335° C. The calcination temperature is selected so that substantially all the boehmite in the sample is retained. The atmosphere can comprise molecular oxygen, any inert gas such as nitrogen, or any mixture thereof. Preferably, the atmosphere is oxidizing. More preferably, the atmosphere comprises air. Calcining at about 325° C. in air retains all the boehmite in the sample. The resulting preheated support material comprising boehmite is substantially non-dispersible boehmite, where non-dispersible refers to non-dispersion in aqueous solution. Without intending to be limited by theory, it is believed that calcining boehmite at a temperature of from about 250° C. to about 350° C. produces a substantially non-dispersible boehmite, and wherein a substantially non-dispersible boehmite is not dispersible in water or an aqueous solution, and wherein said aqueous solution may comprise a catalyst material such as a compound of a catalytic metal.

The stabilized support can be made by a method that includes contacting a material comprising boehmite with a structural stabilizer and then treating said boehmite in the presence of said structural stabilizer.

The stabilized support is preferably derived from the boehmite by contacting boehmite with the structural stabilizer so as to form a support precursor and treating the support precursor so as to form a stabilized support. The stabilized support preferably has hydrothermal stability. Contacting the boehmite with the structural stabilizer preferably includes forming a mixture comprising a boehmite material and a compound of the structural stabilizer in a solvent. The mixture should have a solid content of from about 20% to about 60% by weight of the total mixture weight. The mixture may be a sol or a slurry. More than one structural stabilizer or more than one compound of a structural stabilizer can be used to form the mixture. Treating preferably includes a drying step and a calcining step. The drying step includes conventional drying (such as in an oven) and/or spray drying. In alternative embodiments, an additional amount of at least one structural stabilizer is added to the stabilized support. The added at least one structural stabilizer can be the same or different than the at least one structural stabilizer contacted with the boehmite.

In a preferred embodiment, contacting the boehmite with a structural stabilizer to form the support precursor preferably includes forming a sol comprising a boehmite material and a compound of the structural stabilizer. The sol should have a solid content of from about 20% to about 60% by weight of the total sol weight. When the drying step includes spray drying, the sol preferably should have a solid content of from about 20% to about 40% by weight of the total sol weight. It should be understood that more than one structural stabilizer or more than one compound of a structural stabilizer can be added to the sol. Forming the sol can also comprise dispersing the boehmite material in a solvent to form a sol and adding a compound of the structural stabilizer to the sol or can comprise dispersing a compound of the structural stabilizer in a solvent to form a sol and adding the boehmite material to the sol. Alternatively, forming the sol can include dispersing the boehmite material in a first solvent to form a first sol, dispersing a compound of at least one structural stabilizer in a second solvent to form a second sol or a solution, and combining the first sol with the second sol or solution. This particular embodiment of the method of making a stabilized support may be useful when the first solvent used to make the boehmite sol would not be suitable for the compound of the structural stabilizer.

In another embodiment, forming the mixture includes dispersing the boehmite material in a first solvent to form a sol, dispersing a compound of at least one structural stabilizer in a second solvent to form a gel, and combining the sol and the gel to make a slurry. In this embodiment, it may be desirable to contact the boehmite material with one inorganic oxide or a combination of inorganic oxides. For example, it is envisioned that a sol comprising boehmite is formed and one oxide of a structural stabilizers or a combination of oxides of structural stabilizers, such as inorganic oxides, are dispersed in a solvent to form a gel with inorganic oxide(s). Non-limiting examples of oxides of structural stabilizers include silica, alumina, titania, zirconia, magnesia, boria, ceria, thoria, and combinations thereof. The sol and the inorganic oxide gel are combined to form the mixture. Preferably, forming a gel with inorganic oxide(s) comprises precipitating the inorganic oxide or co-precipitating at least two inorganic oxides. The inorganic oxide gel preferably comprises a co-precipitated silica-alumina gel. The silica-alumina gel should have a molar ratio of silica to alumina preferably between about 500:1 and about 1:1, more preferably between about 500:1 and about 3:1. The silica-alumina gel is preferably made by the co-precipitation of an aluminate compound and a silicate compound (for example, sodium aluminate and sodium silicate) with the addition of an acid (such as nitric acid) by adding an acid so as to form a co-precipitated silica-alumina gel. Sufficient amounts of aluminate compound and silicate compound are selected to produce a molar ratio of silica to alumina between about 500:1 and about 1:1, preferably between about 500:1 and about 3:1. A hydrogel is obtained within a few seconds to several hours, and the gelation pH should be above 7, preferably between about 9 and about 11. The hydrogel is then aged for more than about 0.5 hour, preferably not more than about 80 hours at room temperature.

An alternate method to forming the support precursor comprises forming a boehmite sol by dispersing boehmite material in a solvent to form the boehmite sol, drying the boehmite sol to form dried boehmite sol, and depositing a structural stabilizer compound to the dried boehmite sol.

Yet another alternate method for making a stable catalyst support comprises a) forming a mixture of a boehmite material and at least a portion of a structural stabilizer; b) drying the mixture; c) treating the dried mixture comprising boehmite and the portion of structural stabilizer to form a partially-stabilized support; d) applying another portion of the structural stabilizer to the partially-stabilized support to form a support precursor; and e) treating the support precursor to form a stabilized support.

For all the different embodiments of the method of making the stabilized support, the drying step can be performed by conventional drying (for example, in a conventional oven) or by spray drying. When the drying step is performed by conventional drying, drying the mixture preferably occurs in an oven at a temperature between about 75° C. and about 200° C., more preferably between about 80° C. and about 150° C. Typically, drying proceeds for from 0.5 to 36 hours at a pressure of from about 0 atm to about 10 atm, more preferably from about 0 to about 2 atm, most preferably at about 1 atm. When the drying step is performed by spray-drying, spray-drying comprises passing the mixture through a spray-drier with an inlet temperature of from about 200° C. to about 425° C. and an outlet temperature of from about 100° C. to about 140° C. In large-scale preparation, the drying step preferably comprises at least one spray-drying step.

In alternative embodiments, one structural stabilizer can be incorporated into the support by means of different techniques. For example only, a first step such as drying the mixture (such as a sol) containing boehmite and a compound of the structural stabilizer deposits a fraction of the stabilizer to form a partially-stabilized dried material, and a second step such as impregnation, precipitation, chemical vapor deposition, and the like deposits another fraction of the stabilizer to the partially-stabilized dried material obtained in the first step to form a stabilized support. It should also be understood that any combination of techniques or multiple steps of the same technique could be used to deposit a structural promoter or several structural promoters to the partially-stabilized material.

In further embodiments, two or more structural stabilizers can be incorporated into the support by means of several techniques. For example only, a first stabilizer can be deposited by drying a mixture (such as a sol) containing boehmite and a compound of that structural stabilizer to form a partially-stabilized dried material, and a second stabilizer is deposited on the partially-stabilized dried material obtained in the first step using a method such as impregnation, precipitation, chemical vapor deposition, and the like, to obtain a stabilized support. It should also be understood that multiple steps of the same technique could be used to deposit one structural promoter or several structural promoters.

In additional embodiments, contacting the boehmite with the structural stabilizer to form the precursor support includes dispersing the boehmite in a solvent to form a sol, drying the sol so as to form a dried boehmite, and then depositing one or more structural stabilizers to the dried boehmite to form the support precursor. The deposition can be done using any technique well known in the art, such as but not limited to, incipient wetness impregnation, precipitation, chemical vapor deposition, and the like. It should also be understood that any combination of techniques or multiple steps of the same technique could be used to deposit a structural promoter or several structural promoters to the dried boehmite. The sequence of a combination of techniques is not believed to be of criticality.

When a structural stabilizer is deposited by impregnation to a dried boehmite (partially stabilized or not), the compound containing the structural stabilizer is preferably dissolved in an organic solvent.

Suitable solvents for the preparation of the mixture with boehmite include water and/or an organic solvent such as methanol, acetone, ethanol, and the like. Suitable compounds of the structural stabilizer soluble in the solvent can include, for example but not limited to, salts thereof, acids thereof, hydroxides thereof, and oxides thereof.

In some embodiments, when the solvent comprises water, the pH of the sol should be below about 7. Preferably, the pH of the sol is between about 3 and about 7 and more preferably between about 4 and about 6. Acids or acidic solutions, such as acetic acid, nitric acid, formic acid, boric acid, or combinations thereof can be added to the sol in order to adjust the pH of the sol. The Applicants believe that acids act as peptizing agents, which strengthen the molecular structure of the material by creating shorter bonds between molecules and tightening the structural lattice. The acidic condition during drying (conventionally drying or spray drying) should then confer greater structural integrity to the support.

The support precursor is preferably treated to form the stabilized support. The treatment can include drying the support. Drying the support preferably occurs at a temperature between about 75° C. and about 200° C., more preferably between about 80° C. and about 150° C. Typically, drying proceeds for from 0.5 to 36 hours at a pressure of from 0 atm to about 10 atm, more preferably from about 0 to about 5 atm, most preferably at about 1 atm. When the preparation of the support comprises multiple techniques such as for example, spray drying followed by impregnation, chemical vapor deposition, or precipitation, the treatment of the support by drying preferably proceeds after each technique is used.

Alternatively or in combination with drying, treating the support material can include calcining the support material, preferably in an oxidizing atmosphere. The calcining conditions include a temperature between about 300° C. and about 900° C., preferably about 400° C. and about 900° C., more preferably between about 500° C. and about 800° C. Typically, the calcining proceeds from 0.5 to 36 hours at a pressure of about 0 atm, more preferably from about 1 atm to about 5 atm, most preferably at about 1 atm. The calcining in an oxidizing atmosphere preferably achieves oxidation of any deposited compound or salt of a structural stabilizer to an oxide compound of the structural stabilizer. Further, this treatment preferably proceeds at a temperature less than the temperature at which loss of support surface area is appreciable. It is believed that at temperatures above 900° C., loss of support surface area is appreciable. When the preparation of the support comprises multiple techniques such as spray drying followed by impregnation, chemical vapor deposition, or precipitation, the heating step in an oxidizing atmosphere preferably proceeds after the last technique is used but can also be done after each technique is used.

Catalyst Composition

The present catalyst preferably includes a catalytic metal. The catalytic metal is preferably a Fischer-Tropsch catalytic metal. In particular, the catalytic metal is preferably selected from among the Group 8 elements of the Periodic Table, such as iron (Fe), ruthenium (Ru), and osmium (Os); Group 9 elements, such as cobalt (Co), rhodium (Rh), and iridium (Ir); Group 10 elements, such as nickel (Ni), palladium (Pd), and platinum (Pt); and the metals molybdenum (Mo), rhenium (Re), and tungsten (W). The catalytic metal more preferably comprises at least one of cobalt, iron, ruthenium, nickel, and combinations thereof. The catalytic metal still more preferably comprises cobalt, iron, ruthenium, or mixtures thereof. Most preferably, the catalytic metal comprises cobalt. The catalyst preferably contains a catalytically effective amount of the catalytic metal. The amount of catalytic metal present in the catalyst may vary widely.

When the catalytic metal is cobalt, the catalyst preferably has a nominal composition that includes cobalt in an amount totaling from about 1% to about 50% by weight (as the metal) of total catalyst composition (catalytic metal, support, and any optional promoters), more preferably from about 5% to about 40% by weight, still more preferably from about 10 to about 37% by weight, and most preferably from about 15 to about 35% by weight. It will be understood that % indicates percent throughout the present specification.

When the catalytic metal is iron, the catalyst preferably has a nominal composition including from about 5 to about 75 wt. % iron, preferably from about 10 to about 60 wt. % iron, more preferably from about 20 to about 50 wt. % iron.

When the catalytic metal is ruthenium, the catalyst preferably has a nominal composition including from about 0.01 to about 5 wt. % ruthenium, preferably from about 0.5 to about 4 wt. % ruthenium, more preferably from about 1 to about 3 wt. % ruthenium.

It will be understood that, when the catalyst includes more than one supported metal, the catalytic metal, as termed herein, is the primary supported metal present in the catalyst. The primary supported metal is preferably determined by weight, wherein the primary supported metal is preferably present in the greatest % by weight.

The catalytic metal contained by a catalyst according to a preferred embodiment of the present invention is preferably in a reduced, metallic state before use of the catalyst in the Fischer-Tropsch synthesis. However, it will be understood that the catalytic metal can be present in the form of a metal compound, such as a metal oxide, a metal hydroxide, and the like. The catalytic metal is preferably uniformly dispersed throughout the support. It is also understood that the catalytic metal can also be present at the surface of the support, in particular on the surface or within a surface region of the support, or that the catalytic metal can be non-homogeneously dispersed onto the support.

Optionally, the present catalyst can also include at least one promoter known to those skilled in the art. The promoter may vary according to the catalytic metal. A promoter can be an element that also, in an active form, has catalytic activity in the absence of the catalytic metal. Such an element will be termed herein a promoter when it is present in the catalyst in a lesser wt. % than the catalytic metal.

A promoter preferably enhances the performance of the catalyst. Suitable measures of the performance that may be enhanced include selectivity, activity, stability, lifetime, reducibility and resistance to potential poisoning by impurities such as sulfur, nitrogen, and oxygen. A promoter is preferably a Fischer-Tropsch promoter, which is an element or compound that enhances the performance of a Fischer-Tropsch catalyst in a Fischer-Tropsch process.

It will be understood that as contemplated herein an enhanced performance of a promoted catalyst can be calculated according to any suitable method known to one of ordinary skill in the art. In particular, an enhanced performance can be given as a percent and computed as the ratio of the performance difference to the performance of a reference catalyst. The performance difference is between the performance of the promoted catalyst and the reference catalyst, wherein the reference catalyst is a similar corresponding catalyst having the nominally same amounts, e.g. by weight percent, of all components except the promoter. It will further be understood that as contemplated herein a performance can be measured in any suitable units. For example, when the performance is productivity, productivity can be measured in grams product per hour per liter reactor volume, grams product per hour per kilogram catalyst, and the like.

Suitable promoters vary with the catalytic metal and can be selected from Groups 1–15 of the Periodic Table of the Elements. A promoter can be in elemental form. Alternatively, a promoter can be present in an oxide compound. Further, a promoter can be present in an alloy containing the catalytic metal. Except as otherwise specified herein, a promoter is preferably present in an amount to provide a weight ratio of elemental promoter:elemental catalytic metal of from about 0.00005:1 to about 0.5:1, preferably from about 0.0005:1 to about 0.25:1 (dry basis). When the promoter comprises a metal from Groups 7, 8, 9, and 10 of the Periodic Table such as rhenium, ruthenium, platinum, or palladium, the weight ratio of elemental promoter:elemental catalytic metal may be between about 0.00005:1 and about 0.05:1.

Further, when the catalytic metal is cobalt or iron, suitable promoters include Group 1 elements such as potassium (K), lithium (Li), sodium (Na), and cesium (Cs); Group 2 elements such as calcium (Ca), magnesium (Mg), strontium (Sr), and barium (Ba); Group 3 elements such as scandium (Sc), yttrium (Y), and lanthanum (La); Group 4 elements such as titanium (Ti), zirconium (Zr), and hafnium (Hf); Group 5 elements such as vanadium (V), niobium (Nb), and tantalum (Ta); Group 6 elements such as molybdenum (Mo) and tungsten (W); Group 7 elements such as rhenium (Re) and manganese (Mn); Group 8 elements such as ruthenium (Ru) and osmium (Os); Group 9 elements such as rhodium (Rd) and iridium (Ir); Group 10 elements such as platinum (Pt) and palladium (Pd); Group 11 elements such as silver (Ag) and copper (Cu); Group 12 elements such as zinc (Zn), cadmium (Cd), and mercury (Hg); Group 13 elements such as gallium (Ga), indium (In), thallium (Tl), and boron (B); Group 14 elements such as tin (Sn) and lead (Pb); and Group 15 elements such as phosphorus (P), bismuth (Bi), and antimony (Sb).

When the catalytic metal is cobalt, iron, or combinations thereof, the promoter preferably comprises platinum, palladium, ruthenium, rhenium, silver, boron, copper, lithium, sodium, potassium, magnesium, or combinations thereof.

When the catalytic metal is cobalt, the promoter more preferably comprises rhenium, ruthenium, platinum, palladium, boron, silver, or combinations thereof.

When the cobalt catalyst includes rhenium, the rhenium is preferably present in the catalyst in an amount between about 0.001 and about 5% by weight, more preferably between about 0.01 and about 2% by weight, most preferably between about 0.2 and about 1% by weight.

When the cobalt catalyst includes ruthenium, the ruthenium is preferably present in the catalyst in an amount between about 0.0001 and about 5% by weight, more preferably between about 0.001 and about 1% by weight, most preferably between about 0.01 and about 1% by weight.

When the cobalt catalyst includes platinum, the platinum is preferably present in the catalyst in an amount between about 0.00001 and about 5% by weight, more preferably between about 0.0001 and about 1% by weight, and most preferably between about 0.0005 and about 1% by weight.

When the cobalt catalyst includes palladium, the palladium is preferably present in the catalyst in an amount between about 0.00001 and about 5% by weight, more preferably between about 0.0001 and about 2% by weight, most preferably between about 0.0005 and about 1% by weight.

When the cobalt catalyst includes silver, the catalyst preferably has a nominal composition including from about 0.01 to about 10 wt % silver, more preferably from about 0.07 to about 7 wt % silver, still more preferably from about 0.1 to about 5 wt % silver.

When the cobalt catalyst includes boron, the catalyst preferably has a nominal composition including from about 0.025 to about 2 wt % boron, more preferably from about 0.05 to about 1.8 wt. % boron, still more preferably from about 0.075 to about 1.5 wt % boron.

By way of example and not limitation, when the catalytic metal is iron, suitable promoters include copper (Cu), potassium (K), silicon (Si), zirconium (Zr), silver (Ag), lithium (Li), sodium (Na), rubidium (Rb), cesium (Cs), magnesium (Mg), calcium (Ca), strontium (Sr), and barium (Ba). When the catalytic metal is iron, the promoter more preferably comprises potassium, copper, lithium, sodium, silver, magnesium, or combinations thereof. When the catalytic metal is iron, the catalyst may include potassium or lithium as a promoter; and alternatively or in combination, the catalyst may include copper or silver.

When the iron catalyst comprises lithium as a promoter, lithium is present in an amount preferably between about 0.05 wt % and about 5 wt % of lithium to total weight of catalyst; and more preferably, between about 0.5 wt % and about 2 wt %.

When the iron catalyst comprises silver as a promoter, silver is present in an amount preferably between about 0.001 wt % and about 5 wt % of silver to total weight of catalyst; more preferably between about 0.001 wt % and about 2 wt % of silver to total weight of catalyst; and most preferably between about 0.005 wt % and 1 wt % of silver to total weight of catalyst.

When the iron catalyst comprises potassium as a promoter, potassium is present in an amount preferably between about 0.0001 wt % and about 10 wt % of potassium to total weight of catalyst; more preferably, between about 0.0005 wt % and about 1 wt % of potassium to total weight of catalyst; and most preferably, between about 0.0005 wt % and about 0.5 wt % of potassium to total weight of support.

When the iron catalyst comprises calcium as a promoter, calcium is present in an amount preferably between about 0.001 wt % and about 4 wt % of calcium to total weight of catalyst; more preferably, between about 0.5 wt % and about 3 wt % of calcium to total weight of catalyst.

When the iron catalyst comprises copper as a promoter, copper is preferably present in an amount to provide a nominal catalyst composition including between about 0.1 wt. % and about 10 wt. % copper.

Alternatively, by way of example and not limitation, when the catalytic metal is ruthenium, suitable promoters include rhenium. When the ruthenium catalyst includes rhenium, the rhenium is preferably present in the catalyst in an amount between about 0.001 and about 1% by weight, more preferably between about 0.01 and about 0.5% by weight, still more preferably between about 0.05 and about 0.5% by weight.

As used herein, a nominal composition is preferably a composition specified with respect to an active catalyst. The active catalyst can be either fresh or regenerated. The nominal composition can be determined by experimental elemental analysis of an active catalyst. Alternatively, the nominal composition can be determined by numerical analysis from the known amounts of catalytic metal, promoter, and support used to make the catalyst. It will be understood that the nominal composition as determined by these two methods will typically agree within conventional accuracy.

Further, as used herein, it will be understood that each of the ranges, such as of ratio or weight %, herein is inclusive of its lower and upper values.

Catalyst Preparation

The present catalysts can be prepared by any of the methods known to those skilled in the art. By way of illustration and not limitation, methods of preparing a supported catalyst include impregnating a catalyst material onto the support, extruding the support material together with catalyst material to prepare catalyst extrudates, spray-drying the catalyst material and the support from a solution containing both, and/or precipitating the catalyst material onto a support. Accordingly, the supported catalysts of the present invention can be used in the form of powders, particles, pellets, monoliths, honeycombs, packed beds, foams, and aerogels. The catalyst material can include any one or combination of a catalytic metal, a precursor compound of a catalytic metal, a promoter, and a precursor compound of a promoter.

The most preferred method of preparation may vary among those skilled in the art depending, for example, on the desired catalyst particle size. Those skilled in the art are able to select the most suitable method for a given set of requirements.

One method of preparing a catalyst by impregnating a catalyst material onto a support includes impregnating the support with a solution containing the catalyst material. Suitable solvents include water and organic solvents (e.g., toluene, methanol, ethanol, and the like). Those skilled in the art will be able to select the most suitable solvent for a given catalyst material. The catalyst material can be in the form of a salt of a catalytic metal or promoter element. Thus, one method of preparing a supported metal catalyst is by incipient wetness impregnation of the support with a solution of a soluble metal salt. Incipient wetness impregnation preferably proceeds by solution of a cobalt compound in a minimal amount of solvent sufficient to fill the pores of the support. Alternatively, the catalyst material can be in the form of a zero valent compound of a catalytic metal or promoter element. Thus, another preferred method is to impregnate the support with a solution of zero valent metal such as cobalt carbonyl (e.g. $Co_2(CO)_8$, $Co_4(CO)_{12}$) or the like. Multiple steps of impregnation can be done to achieve the desired amount of metal loading.

Another method of preparing a catalyst by impregnating a catalyst material onto a support includes impregnating the support with a molten salt of a catalytic metal or promoter. Thus, another method includes preparing the supported metal catalyst from a molten metal salt. One preferred method is to impregnate the support with a molten metal nitrate (e.g., $Co(NO_3)_2 \cdot 6H_2O$). A promoter compound can be impregnated separately from any cobalt, in a separate step. Alternatively, a promoter compound can be impregnated simultaneously with, e.g. in the same solution as, at least a portion of the catalytic metal.

When a catalyst material is impregnated as a precursor of the material, e.g. a salt or a zero valent compound, those skilled in the art will be able to select suitable precursors.

By way of example and not limitation, suitable cobalt-containing precursor compounds include, for example, hydrated cobalt nitrate (e.g. cobalt nitrate hexahydrate), cobalt carbonyl, cobalt acetate, cobalt acetylacetonate, cobalt oxalate, and the like. Hydrated cobalt nitrate, cobalt carbonyl and cobalt acetate are exemplary of cobalt-containing precursor compounds soluble in water. Cobalt oxalate is soluble in acids or acidic solutions. Cobalt acetate and cobalt acetylacetonate are exemplary of cobalt-containing precursor compounds soluble in an organic solvent.

Suitable rhenium-containing precursor compounds soluble in water are preferred and include, for example, perrhenic acid, ammonium perrhenate, rhenium pentacarbonyl chloride, rhenium carbonyl, and the like.

Suitable ruthenium-containing precursor compounds soluble in water include for example ruthenium carbonyl, $Ru(NH_3)_6 \cdot Cl_3$, Ru(III)2,4-pentanedionoate, ruthenium nitrosyl nitrate, and the like. Water-soluble ruthenium-containing precursor compounds are preferred.

Suitable platinum-containing precursor compounds soluble in water include, for example, $Pt(NH_3)_4(NO_3)_2$ and the like. Alternatively, the platinum-containing precursor can be soluble in an organic solvent, such as platinum acetyl acetonate soluble in acetone.

Suitable boron-containing precursor compounds soluble in water include, for example, boric acid and the like. Alternatively, the boron-containing precursor can be soluble in an organic solvent.

Suitable silver-containing precursor compounds soluble in water include, for example, silver nitrate ($AgNO_3$) and the like. Alternatively, the silver-containing precursor can be soluble in an organic solvent.

Suitable palladium-containing precursor compounds include palladium nitrate ($Pd(NO_3)_2$) and the like. Suitable palladium-containing precursor compounds soluble in an organic solvent include palladium dioxide ($PdO_2$), which is soluble in acetone, and the like.

The impregnated support is preferably treated to form a treated impregnated support. The treatment can include drying the impregnated support. Drying the impregnated support preferably occurs at a temperature between about 80° C. and about 150° C. Typically, drying proceeds for from about 0.5 to about 24 hours at a pressure of from about 1 to about 75 atm, more preferably from about 1 to about 10 atm, most preferably at about 1 atm.

Alternatively or in combination to drying, treating an impregnated support to form a treated impregnated support can include calcining the impregnated support. The calcination preferably achieves oxidation of any impregnated compound or salt of a supported material to an oxide compound of the supported material. When the catalytic metal includes cobalt, the calcination preferably proceeds at a temperature of at least about 200° C. Further, the calcination preferably proceeds at a temperature less than the temperature at which loss of support surface area is appreciable. It is believed that at temperatures above 900° C. loss of support surface area is appreciable. Typically, calcining proceeds from about 0.5 to about 24 hours at a pressure of about 0.01 to about 75 atm, more preferably from about 1 to about 10 atm, most preferably at about 1 atm. When the preparation of the catalyst proceeds via a multi-step impregnation of a catalytic metal on the stabilized support, any calcining of the catalyst after any impregnation following the first one preferably proceeds at a temperature of not more than about 500° C., preferably not more than about 450° C., more preferably not more than about 350° C.

The impregnation of catalytic metal and any optional promoter on a support can proceed by multi-step impregnation, such as by two, three, or four impregnation steps. Each impregnation step can include impregnation of any one or combination of a catalytic metal and promoter. Each impregnation step can be followed by any of the above-described treatments of the impregnated support. In particular, each step of impregnating the support to form an impregnated support can be followed by treating the impregnated support to form a treated impregnated support. Thus, a multi-step impregnation can include multiple steps of drying and/or calcination. Each subsequent step of drying can proceed at a different temperature from any earlier steps of drying. Further, each subsequent step of calcination can proceed at a different temperature than the temperature used in any earlier steps of calcination. By way of example and not limitation, a multi-step impregnation can include calcining the support at a first temperature that is higher than the temperature for subsequent calcinations.

Typically, at least a portion of the metal(s) of the catalytic metal component of the catalysts of the present invention is present in a reduced state (i.e., in the metallic state). Therefore, it is normally advantageous to activate the catalyst prior to use by a reduction treatment in the presence of a reducing gas at an elevated temperature. The reducing gas preferably includes hydrogen. Typically, the catalyst is treated with hydrogen or a hydrogen-rich gas at a temperature in the range of from about 75° C. to about 500° C., for about 0.5 to about 50 hours at a pressure of about 1 to about 75 atm. Pure hydrogen can be used in the reduction treatment. Moreover, a mixture of hydrogen and an inert gas such as nitrogen or a mixture of hydrogen and other gases as are known in the art, such as carbon monoxide and carbon dioxide, can be used in the reduction treatment. Reduction with pure hydrogen and reduction with a mixture of hydrogen and carbon monoxide are preferred. The amount of hydrogen may range from about 1% to about 100% by volume.

Fischer-Tropsch Operation

A process for producing hydrocarbons preferably includes contacting a feed stream that includes carbon monoxide and hydrogen with the present catalyst. Alternatively or in combination, a process for producing hydrocarbons includes contacting a feed stream that includes carbon monoxide and hydrogen with a catalyst in a reaction zone to produce hydrocarbons, wherein the catalyst is a catalyst made according to the present method.

The feed gas charged to the process for producing hydrocarbons includes hydrogen, or a hydrogen source, and carbon monoxide. $H_2/CO$ mixtures suitable as a feedstock for conversion to hydrocarbons according to the process of this invention can be obtained from light hydrocarbons such as methane by means of steam reforming, partial oxidation, or other processes known in the art. Preferably, the hydrogen is provided by free hydrogen, although some Fischer-Tropsch catalysts have sufficient water gas shift activity to convert some water and carbon monoxide to hydrogen and carbon dioxide, which produces hydrogen for use in the Fischer-Tropsch process. It is preferred that the molar ratio of hydrogen to carbon monoxide in the feed be greater than 0.5:1 (e.g., from about 0.67 to 2.5). Preferably, when cobalt, nickel, and/or ruthenium catalysts are used, the feed gas stream contains hydrogen and carbon monoxide in a molar ratio of about 1.6:1 to 2.3:1. Preferably, when iron catalysts are used, the feed gas stream contains hydrogen and carbon monoxide in a molar ratio between about 1.4:1 and 2.3:1. The feed gas may also contain carbon dioxide. The feed gas stream should contain only a low concentration of compounds or elements that have a deleterious effect on the catalyst, such as poisons. For example, the feed gas may need to be pretreated to ensure that it contains low concentrations of sulfur or nitrogen compounds such as hydrogen sulfide, ammonia, hydrogen cyanide, and carbonyl sulfides.

The feed gas is contacted with the catalyst in a reaction zone. Mechanical arrangements of conventional design may be employed as the reaction zone including, for example, plug flow, continuous stirred tank, fixed bed, fluidized bed, slurry phase, slurry bubble column, reactive distillation column, or ebulliating bed reactors, among others. The size and physical form of the catalyst may vary, depending on the reactor in which it is to be used. Plug flow, fluidized bed, reactive distillation, ebulliating bed, and continuous stirred tank reactors have been delineated in "Chemical Reaction Engineering," by Octave Levenspiel, and are known in the art, as are slurry bubble column. A preferred slurry bubble column is described in co-pending commonly assigned U.S. patent application Ser. No. 10/193,357, hereby incorporated herein by reference.

When the reaction zone includes a slurry bubble column, the column preferably includes a three-phase slurry. Further, a process for producing hydrocarbons by contacting a feed stream including carbon monoxide and hydrogen with a catalyst in a slurry bubble column preferably includes dispersing the particles of the catalyst in a liquid phase comprising the hydrocarbons to form a two-phase slurry and dispersing the hydrogen and carbon monoxide in the two-phase slurry to form the three-phase slurry. Further, the slurry bubble column preferably includes a vertical reactor, and dispersal preferably includes injection and distribution in the bottom half of the reactor.

The Fischer-Tropsch process is typically run in a continuous mode. In this mode, the gas hourly space velocity through the reaction zone typically may range from about 50 to about 10,000 $hr^{-1}$, preferably from about 300 $hr^{-1}$ to about 2,000 $hr^{-1}$. The gas hourly space velocity is defined as the volume of reactants per time per reaction zone volume. The volume of reactant gases is at standard conditions (standard pressure of 101 kPa and standard temperature of 0° C.). The reaction zone volume is defined by the portion of the reaction vessel volume where the reaction takes place and which is occupied by a gaseous phase comprising reactants, products and/or inerts; a liquid phase comprising liquid/wax products and/or other liquids; and a solid phase comprising catalyst. The reaction zone temperature is typically in the range from about 160° C. to about 300° C. Preferably, the reaction zone is operated at conversion promoting conditions at temperatures from about 190° C. to about 260° C., more preferably from about 205° C. to about 230° C. The reaction zone pressure is typically in the range of about 80 psia (552 kPa) to about 1000 psia (6,895 kPa), more preferably from 80 psia (552 kPa) to about 800 psia (5,515 kPa), and still more preferably from about 140 psia (965 kPa) to about 750 psia (5,170 kPa). Most preferably, the reaction zone pressure is from about 250 psia (1,720 kPa) to about 650 psia (4,480 kPa).

The products resulting from the process will have a great range of molecular weights. Typically, the carbon number range of the product hydrocarbons will start at methane and continue to about 50 to 100 carbons or more per molecule as measured by current analytical techniques. The process is particularly useful for making hydrocarbons having five or more carbon atoms, especially when the above-referenced preferred space velocity, temperature and pressure ranges are employed.

The wide range of hydrocarbons produced in the reaction zone will typically afford liquid phase products at the reaction zone operating conditions. Therefore, the effluent stream of the reaction zone will often be a mixed phase stream including liquid and gas phase products. The effluent gaseous stream of the reaction zone can be cooled to condense additional amounts of hydrocarbons and can be passed into a vapor-liquid separation zone separating the liquid and vapor phase products. The gaseous material can be passed into a second stage of cooling for recovery of additional hydrocarbons. The liquid material from the reaction zone together with any liquid from a subsequent separation zone can be fed into a fractionation column. Typically, a stripping column is employed first to remove light hydrocarbons such as propane and butane. The remaining hydrocarbons can be passed into a fractionation column in which they are separated by boiling point range into products such as naphtha, kerosene and fuel oils. Hydrocarbons recovered from the reaction zone and having a boiling point above that of the desired products can be passed into conventional processing equipment such as a hydrocracking zone in order to reduce their molecular weight to that of desired products such as middle distillates and gasoline. The gas phase recovered from the reactor zone effluent stream after hydrocarbon recovery can be partially recycled if it contains a sufficient quantity of hydrogen and/or carbon monoxide.

The invention having been generally described, the following EXAMPLES are given as particular embodiments of the invention and to demonstrate the practice and advantages hereof. It is understood that the examples are given by way of illustration and are not intended to limit the specification or the claims to follow in any manner.

EXAMPLES

EXAMPLES S1–S5 of catalyst supports and catalyst EXAMPLES C1–C4 active for the Fischer-Tropsch synthesis were prepared using a boehmite material having an average crystallite size about 15 nanometers. Support EXAMPLES S1–S4 have been stabilized by a structural stabilizer comprising one element (Mg, Co, Si, or Al respectively), and support EXAMPLE S5 has been stabilized by a co-precipitated silica-alumina. A comparative catalyst support example EXAMPLE S0 was also prepared from the same boehmite material without a structural stabilizer. A description of the preparation of these supports and catalysts EXAMPLES is provided below.

Example S0

Unmodified Catalyst Support

An unmodified support EXAMPLE S0 was made as a reference with no structural stabilizer using a boehmite material Dispal® 18N4-80, which is commercially available from Sasol. The boehmite material was mixed in deionized water to make a sol with a solid content of about 35% by weight. The sol was then dried at 100° C. for 16 hours. Finally, the dried material was calcined at 725° C. for 4 hours at atmospheric pressure. The catalyst supports of S0 contained no structural stabilizer.

Examples S1–S4

Modified Catalyst Support

Four catalyst supports EXAMPLES S1–S4 were made with four different structural stabilizers (magnesium, cobalt, silicon, and aluminum) using the same boehmite material (Dispal®18N4-80 from Sasol) used in EXAMPLE S0. The boehmite was mixed with one of the following structural stabilizer compounds: magnesium nitrate, cobalt nitrate, silicic acid, or aluminum nitrate for EXAMPLES S1–S4, respectively, in deionized water to make a sol with a solid content of about 35% by weight. The sol was then dried at 100° C. for 16 hours. Finally, the dried material was calcined at 725° C. for 4 hours at atmospheric pressure. The catalyst support of EXAMPLES S1–S4 had a final structural stabilizer content of 2 wt % Mg, 2 wt % Co, 2 wt % Si, and 2 wt % Al, respectively, wherein wt % represents percent by weight based on the total weight of the final catalyst support. Throughout the specification, "wt %", "% by weight", and "percent by weight" are being used interchangeably. It should be noted that, for EXAMPLE S4, since aluminum was added as a structural stabilizer to the boehmite material, which already comprises about 42 wt % aluminum, the actual nominal composition of aluminum weight in the stabilized catalyst support should be about 43 wt % aluminum, while support EXAMPLES S1–S3 have an aluminum content of about 41 wt %.

Example S5

Catalyst Support Modified with Silica-Alumina

The catalyst support EXAMPLE S5 was made with the addition of a co-precipitated silica-alumina to the same boehmite material (Dispal®18N4-80 from Sasol) used in EXAMPLES S0–S4. The boehmite was mixed in deionized water to make a sol. A low acidity silica-alumina gel with a molar ratio of silica to alumina of 3:1 was prepared by co-precipitating sodium aluminate and sodium silicate with the addition of diluted nitric acid. A hydrogel was obtained within 3 minutes, and the gelation pH was 10.5. The gel was then aged for three days at room temperature. Thereafter, ion exchange was performed with a 1.0 Molar ammonium nitrate solution to convert it from the $Na^+$ to $H^+$-form. Next, the hydrogel was washed with water to remove most of the ammonium nitrate. Finally, the gel was mixed with the boehmite sol to make a mixture with a solid content of about 35% by weight. The mixture was then dried at 100° C. for 16 hours. Finally, the dried material was calcined at 750° C. for 4 hours at atmospheric pressure. The catalyst support of EXAMPLE S5 had a final structural stabilizer content of about 10 wt % silica-alumina, wherein wt % represents percent by weight based on the total weight of the final catalyst support. With a molar ratio of silica to alumina of 3:1, this resulted in an addition of about 3.6 wt % alumina (ca. 1.9 wt % aluminum) and about 6.4 wt % silica (ca. 3.0 wt % silicon) based on the total weight of the final catalyst support. It should be noted that, for EXAMPLE S5, since alumina was added as a structural stabilizer to the boehmite material, which already comprises about 42 wt % aluminum, the actual nominal composition of aluminum weight in the stabilized catalyst support EXAMPLE S5 should be about 40 wt % aluminum.

Examples C1–C4

Catalysts on Stabilized Supports

A multi-step aqueous incipient wetness impregnation method was used to prepare four Fischer-Tropsch catalysts in EXAMPLES C1–C4 from, respectively, the support of EXAMPLES S1–S4, and derived from boehmite and stabilized with 2 wt % of four different structural stabilizers, Mg, Co, Si, and Al. A solution was prepared by combining cobalt nitrate hexahydrate $[Co(NO_3)_2.6H_2O]$, tetraamineplatinum (II)nitrate $[(NH_3)4Pt(NO_3)_2]$, and boric acid $[H_3BO_3]$. A sample from each of support EXAMPLES S1–S4 was impregnated using a portion of the solution prepared above to achieve incipient wetness. The resulting catalyst precursor was dried for 16 hours in an oven at a temperature of about 82° C. The dried catalyst precursor was then calcined in air by raising its temperature at a rate of 1° C./min. to 240° C., followed by holding at this temperature for 4 hours. The above procedure was repeated to obtain the following loading of Co, Pt, and B on the support: 30 wt. % Co; 0.03 wt. % Pt; and 0.5 wt. % B, wherein the weight % is based on the total weight of the final catalyst. It should be noted that, for EXAMPLE C2, since cobalt was added as a structural stabilizer in the support, the actual nominal composition of cobalt of the total catalyst weight is approximately about 31.4 wt %. The Co, Pt, and B metal content in the catalyst was calculated by mass balance after drying and calcination.

Characteristics of Supports and Catalysts Materials

Several properties (BET Surface Area, average pore volume and average pore diameter) of the support materials from EXAMPLES S0–S5 and the catalysts from EXAMPLES C1–C4 are shown in Table 1.

The BET surface area, average pore volume, and average pore diameter were measured by the BJH desorption method using $N_2$ as the adsorptive material of catalysts and supports. Surface area and pore size distribution were obtained on a Micromeritics TriStar 3000 analyzer after degassing the sample at 190° C. in flowing nitrogen for five hours. Surface area was determined by taking ten points in the nitrogen adsorption isotherm between 0.05 and 0.3 relative pressure and by calculating the surface area by the standard BET procedure. Pore size distribution was determined from a minimum of 30 points in the nitrogen desorption isotherm and calculated using the BJH model for cylindrical pores. The instrument control and calculations were performed using the TriStar software and are consistent with ASTM D3663-99 entitled "Surface Area of Catalysts and Catalyst Carriers," ASTM D4222-98 entitled "Determination of Nitrogen Adsorption and Desorption Isotherms of Catalysts by Static Volumetric Measurements," and ASTM D4641-94 entitled "Calculation of Pore Size Distributions of Catalysts from Nitrogen Desorption Isotherms." The initial surface area (A) of the catalyst was determined as the surface area of the catalyst structure prior to contact of reactant gas. The average pore volume (V) of the catalyst ($N_2$ as adsorptive material) was measured and calculated using the method described above. Average pore size (diameter) was calculated as 4V/A.

TABLE 1

Properties of the Supports and Catalysts

| EXAMPLES # | Structural Stabilizer Content on Support, wt % | Catalyst composition, wt % | BET Surface Area, $m^2/g$ | Avg. Pore Volume, ml/g | Avg. Pore Diameter, nm |
|---|---|---|---|---|---|
| S0 | — | — | 128 | 0.45 | 14 |
| S1 | 2 wt % Mg | — | 122 | 0.47 | 16 |
| C1 | 2 wt % Mg | 30 Co/0.03 Pt/ 0.5 B | 67 | 0.22 | 13 |
| S2 | 2 wt % Co | — | 127 | 0.53 | 17 |
| C2 | 2 wt % Co | 30 Co/0.03 Pt/ 0.5 B | 68 | 0.24 | 14 |
| S3 | 2 wt % Si | — | 176 | 0.52 | 12 |
| C3 | 2 wt % Si | 30 Co/0.03 Pt/ 0.5 B | 88 | 0.25 | 11 |
| S4 | 2 wt % Al | — | 109 | 0.46 | 17 |
| C4 | 2 wt % Al | 30 Co/0.03 Pt/ 0.5 B | 59 | 0.18 | 12 |
| S5 | 10 wt % $SiO_2:Al_2O_3$ | — | 197 | 0.56 | 11 |

As shown in Table 1, the introduction of magnesium, cobalt and silicon, or of a co-precipitated silica-alumina into the aluminum structure of the support EXAMPLES S1–S3 and S5 resulted in a maintenance of surface area (ca. 122 $m^2/g$ and ca. 127 $m^2/g$ for magnesium and cobalt respectively) and pore volume (ca. 0.47 ml/g for magnesium) or in an increase in surface area (ca. 176 $m^2/g$ and 197 $m^2/g$ with silicon and silica-alumina, respectively) and pore volume (ca. 0.53 ml/g; ca. 0.52 ml/g; and ca. 0.56 ml/g with silicon, cobalt, and silica-alumina, respectively). Thus, the addition of these four structural stabilizers to boehmite followed by drying/calcination maintained improved pore structures of the resulting aluminum-containing matrices. After deposition of the catalytically active material and promoters on the stabilized supports to produce catalysts, the BET surface area and average pore volume of the catalyst EXAMPLES C1–C4 were about half of those of the corresponding stabilized support EXAMPLES S1–S4 (a BET drop of about 45 to about 50%). The reduction in surface area and pore volume in the catalysts was expected as the atoms of the catalytically active material and of promoters deposited on the surface of the pores, thereby decreasing the available surface areas of the pores and the available volume within the pores.

Hydrothermal Stability

Figure 1:
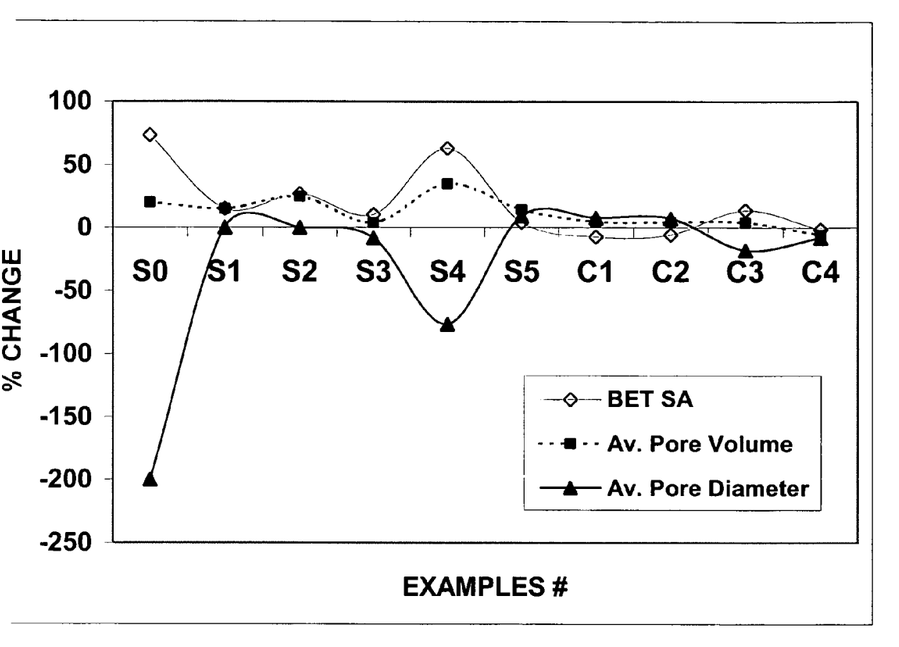

The hydrothermal stability of catalyst support EXAMPLES S0–S5 and catalyst EXAMPLES C1–C4 was determined using a steaming test. The steaming test comprised exposing a 1-g catalyst sample to about 15 g of water in an autoclave at a temperature of 225° C. and a pressure of 375 psig (approximating the Fischer-Tropsch operating conditions) for 2 hours. The catalyst sample was cooled down to room temperature (about 18–20° C.) and then dried at about 80° C. for about 5 hours. Two samples (before and after steam treatment) were then analyzed for changes in surface area and pore size (average pore volume and diameter). Both samples were measured by the BJH desorption method as described above. The results for non-stabilized (unmodified) calcined support EXAMPLE S0, stabilized supports EXAMPLES S1–S5 and catalyst EXAMPLES C1–C4 made therefrom are shown in the drawing.

The drawing shows the relative percentage of change (increase or decrease) in average pore volume, average pore diameter and BET surface area, which was calculated by the following formula:

$$\% \text{ change} = \frac{\text{(value before steam test} - \text{value after steam test)}}{\text{(value before steam test)}}$$

A positive (negative) % change indicates a decrease (increase) in a specific property, and a 0% value indicates no change in the specific property after a steam test. All three support catalyst EXAMPLES S1–S3 modified by a structural stabilizer comprising one element: (Mg, Co, or Si) and the support catalyst EXAMPLE S5 modified by a co-precipitated silica-alumina showed better conservation (least amount of change) in average pore volume, average pore diameter and BET surface area, after the steaming test, than the unmodified support EXAMPLE S0 derived from the same boehmite material but calcined without a structural stabilizer. Hence, modification of the boehmite material with one element (magnesium, cobalt, or silicon) or with a co-precipitated silica-alumina resulted in a catalyst support with improved hydrothermal stability. Catalysts made therefrom conserved the improved hydrothermal stability.

Catalyst Performance

The Fischer-Tropsch catalysts EXAMPLES C1–C3 that were prepared with supports derived from boehmite and stabilized with one structural stabilizer were separately placed in a fixed bed reactor to measure their catalytic performance in the conversion of synthesis gas to hydrocarbons during a Fischer-Tropsch process. The 1-gram catalyst samples diluted with about 12 grams of alpha-alumina to make a total diluted catalyst bed volume of about 10 ml was placed in the tubular ¼-inch i.d. stainless steel reactor. It was first activated in situ by heating to 400° C. at a heating rate of 1° C./min, with the temperature maintained for 16 hours under a flowing gas comprising 50% $H_2$ in nitrogen at 200 standard cubic centimeter per minute (sccm) at atmospheric pressure. The temperature was then reduced to about 210° C. in flowing nitrogen. Once at about 210° C., the nitrogen was replaced by a mixture of 60% $H_2$, 30% CO and 10% $N_2$ at a total pressure of 350 psig. The gas flow was adjusted to 100 sccm to give a gas hourly space velocity (GHSV) of 6,000 $hr^{-1}$, which was measured as the volume of reactant gas at standard pressure and temperature per hour per volume of active catalyst bed. After 24 hours on stream, the temperature was increased to about 220° C. Product mass balance, on-line gas analysis and compositional analysis of the collected liquid and wax were done every 24 hours by conventional gas chromatography methods. The performances (CO conversion, alpha value, $C_1$ make, $C_{5+}$ productivity) of these three catalysts versus the time on stream (TOS) in the fixed bed reactor were then compared, as shown in Table 2 below.

Data in Table 2 indicate that the catalyst EXAMPLES C1–C3 were active for the Fischer-Tropsch synthesis. Furthermore, addition of the structural modifiers to the support did not appear to adversely affect the catalyst activity. As shown in Table 2, catalyst EXAMPLES C1–C3 showed similar initial CO conversion, alpha value, $C_{5+}$ productivity, and methane ($C_1$) make, which suggests each of the three modifiers (Si, Co, Mg) would be acceptable. (Data for catalyst EXAMPLE C1 were only available for one day.) Therefore, catalysts prepared by the modification of boehmite with structural stabilizers exhibited good Fischer-Tropsch synthesis activity.

TABLE 2

Fixed-Bed Results

| Catalyst EXAMPLES (with Stabilizer Content) | TOS, hrs | CO Conv., % | alpha value | $C_{5+}$, g/h/kgcat | $C_1$, wt. % |
|---|---|---|---|---|---|
| C1 (with 2% Mg) | 24 | 46.1 | 0.90 | 481 | 7.9 |
| C2 (with 2% Co) | 24 | 51.1 | 0.89 | 539 | 6.4 |
|  | 48 | 73.4 | 0.90 | 734 | 9.6 |
|  | 72 | 69.8 | 0.90 | 700 | 9.3 |
| C3 (with 2% Si) | 24 | 46.4 | 0.92 | 480 | 7.8 |
|  | 48 | 73.1 | 0.92 | 728 | 9.4 |
|  | 72 | 74.0 | — | 735 | 9.3 |

The following patent applications filed concurrently herewith are hereby incorporated herein by reference: U.S. patent application Ser. No. 10/687,017, entitled "High Hydrothermal Stability Catalyst Support"; U.S. patent application Ser. No. 10/687,140, entitled "A Stabilized Transition Alumina Catalyst Support From Boehmite and Catalysts Made Therefrom"; and U.S. patent application Ser. No. 10/686,977, entitled "Fischer-Tropsch Processes and Catalysts Made From a Material Comprising Boehmite".

Accordingly, the scope of protection is not limited by the description and EXAMPLES set out above, but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Background of the Invention is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

Should the disclosure of any of the patents, patent applications, and publications that are incorporated herein conflict with the present specification to the extent that it might render a term unclear, the present specification shall take precedence.

As used herein, the term "about" or "approximately," when preceding a numerical value, has its usual meaning and also includes the range of normal measurement variations that is customary with laboratory instruments that are commonly used in this field of endeavor (e.g., weight, temperature or pressure measuring devices), preferably within ±10% of the stated numerical value.

Use of the term "optionally" with respect to any element of a claim is intended to mean that the subject element is required, or alternatively, is not required. Both alternatives are intended to be within the scope of the claim.

While preferred embodiments of this invention have been shown and described, modifications thereof can be made by one skilled in the art without departing from the spirit or teaching of this invention. The embodiments described herein are exemplary only and are not limiting. Many variations and modifications of systems and methods are possible and are within the scope of the invention. Accordingly, the scope of protection is not limited to the embodiments described herein, but is only limited by the claims that follow, the scope of which shall include all equivalents of the subject matter of the claims.

The invention claimed is:

1. A process for the production of hydrocarbons from synthesis gas comprising
converting a mixture of hydrogen and carbon monoxide to a product stream comprising hydrocarbons in a reactor comprising a hydrocarbon synthesis catalyst,
wherein the hydrocarbon synthesis catalyst comprises
a catalytically active metal selected form the group consisting of cobalt, ruthenium, iron, nickel, and combinations thereof;
optionally, a promoter; and
a stabilized support prepared by a method comprising drying and calcining a mixture containing a boehmite material and a structural stabilizer or containing a compound of a structural stabilizer and a boehmite material at a calcination temperature between about 500° C. and about 900° C. to form the stabilized support with improved hydrothermal stability,
wherein the structural stabilizer comprises at least one element selected from the group consisting of tungsten (W), tantalum (Ta), niobium (Nb), thorium (Th), germanium (Ge), uranium (U), tin (Sn), antimony (Sb), vanadium (V), halfnium (Hf), sodium (Na), boron (B), magnesium (Mg), aluminum (Al), silicon (Si) calcium (Ca), titanium (Ti), chromium (Cr), manganese (Mn), iron (Fe), cobalt (Co), nickel (Ni), copper (Cu), zinc (Zn), gallium (Ga), strontium (Sr), zirconium (Zr), thorium (Th), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), oxides thereof, and combinations thereof.

2. The process according to claim 1 wherein the structural stabilizer comprises at least one element selected from the group consisting of cobalt, magnesium, zirconium, boron, silicon, oxides thereof, and any combination thereof.

3. The process according to claim 1 wherein the structural stabilizer includes a co-precipitated silica-alumina.

4. The process according to claim 3 wherein the co-precipitated silica-alumina has a molar ratio of silica to alumina between about 1:1 and about 500:1.

5. The process according to claim 1 wherein the stabilized support is in the form of particles.

6. The process according to claim 5 wherein the reactor is a slurry bed reactor or fluidized bed reactor, and the stabilized support has a range of particles sizes between about 10 microns and about 200 microns.

7. The process according to claim 5 wherein the reactor is a fixed bed reactor, and the stabilized support has a range of particles sizes greater than 0.5 mm.

8. The process according to claim 5 wherein the stabilized support has an average size of the particles between about 50 microns and about 90 microns.

9. The process according to claim 5 wherein the particles include a plurality of crystallites with an average size between about 10 in and about 40 nm.

10. The process according to claim 1 wherein the catalytically active metal is cobalt.

11. The process according to claim 10 wherein the promoter comprises rhenium, ruthenium, platinum, palladium, boron, silver, or combinations thereof.

12. The process according to claim 1 wherein the mixture has a pH between about 4 and about 6.

13. The process according to claim 1 wherein drying is performed in a spray drier or in a conventional oven.

14. The process according to claim 1 wherein drying is performed at a temperature between about 75° C. and about 200° C.

15. The process according to claim 1 wherein calcining is accomplished at a temperature between about 500° C. and about 800° C.

16. The process according to claim 1 wherein the reactor is a Fischer-Tropsch reactor operated at a temperature from about 190° C. to about 260° C., and a pressure between about 552 kPa and about 6,895 kPa.

17. The process according to claim 1 wherein the product stream comprises hydrocarbons having 5 or more carbon atoms.

18. The process according to claim 1 wherein the boehmite material is in the form of a powder.

19. The process according to claim 1 wherein the boehmite material is spray-dried boehmite.

20. The process according to claim 19 wherein the spray-dried boehmite has a particle size range of from about 20 microns to about 200 microns.

21. The process according to claim 1 wherein the boehmite material is extruded boehmite.

22. The process according to claim 1 wherein the boehmite material is dispersible in water or in an aqueous solution.

23. The process according to claim 1 wherein the boehmite material is dispersible in acid or an acidic solution.

24. The process according to claim 1 wherein the boehmite material is non-dispersible in water or in an aqueous solution.

25. The process according to claim 1 wherein the boehmite material is synthetic boehmite.

26. The process according to claim 1 wherein the stabilized support has an avenge pore size larger than about 4 nm.

27. The process according to claim 1 wherein the stabilized support has an avenge pore size between about 4 nm and about 20 nm.

28. The process according to claim 1 wherein the stabilized support has a surface area larger than 30 $m^2$ per gram of support.

29. The process according to claim 1 wherein the stabilized support has a surface area between about 50 $m^2$ per gram of support and about 250 $m^2$ per gram of support.

30. The process according to claim 5 wherein the stabilized support has an average particle size between about 50 microns and about 90 microns.

31. The process according to claim 5 wherein the particles have sizes greater than 0.5 millimeter.

32. The process according to claim 1 wherein the structural stabilizer comprises at least one element selected from the group consisting of cobalt, magnesium, zirconium, boron, aluminum, silicon, oxides thereof, and any combination thereof.

33. The process according to claim 1 wherein the mixture has a total mixture weight, and wherein the mixture has a solid content of from about 20% to about 60% by weight of the total mixture weight.

34. The process according to claim 33 wherein the solid content is from about 20% to about 40% by weight of the total mixture weight.

35. The process according to claim 1 wherein the mixture is a slurry.

36. The process according to claim 35 wherein the slurry comprises boehmite in the form of a powder.

37. The process according to claim 36 wherein the particle size range in the powder is adjusted to a desirable range.

38. The process according to claim 1 wherein the method for preparing the stabilized support further comprises pre-treating the boehmite material, wherein the pre-treating step includes spray-drying a suspension of the boehmite material, preheating of the boehmite material, or combination thereof.

39. The process according to claim 38 wherein the pre-treating step includes spray-drying the suspension of the boehmite material and then preheating.

40. The process according to claim 38 wherein the pre-heating step comprises calcining the boehmite material in an oxidizing atmosphere to a temperature ranging from about 250° C. to about 350° C.

41. The process according to claim 38 wherein the pre-heating step provides a substantially non-dispersible boehmite.

42. The process according to claim 1 wherein the mixture is a sol.

43. The process according to claim 1 wherein the mixture comprises water.

44. The process according to claim 43 wherein the mixture has a pH below about 7.

45. The process according to claim 43 wherein the mixture has a pH between about 3 and about 7.

46. The process according to claim 43 wherein the mixture has a pH between about 4 and about 6.

47. The process according to claim 43 wherein the method for preparing the stabilized support further comprises adjusting the pH of the mixture to a pH value between about 4 and about 6 after forming the mixture.

48. The process according to claim 47 wherein the pH of the mixture is adjusted by adding acetic acid, nitric acid, formic acid, boric acid, or combinations thereof.

49. The process according to claim 1 wherein the mixture comprises an organic solvent.

50. The process according to claim 49 wherein the organic solvent comprises methanol, acetone, or ethanol.

51. The process according to claim 1 wherein the drying is performed by spray drying.

52. The process according to claim 1 wherein the drying step is performed by conventional drying.

53. The process according to claim 52 wherein the drying step is performed at a temperature between about 75° C. and about 200° C.

54. The process according to claim 1 wherein the calcining step is performed in an oxidizing atmosphere.

55. The process according to claim 1 wherein the calcining step is performed at a temperature between 725° C. and 750° C.

56. The process according to claim 1 wherein the stabilized support has an enhanced hydrothermal stability and the method for preparing the stabilized support with enhanced hydrothermal stability comprises:
a) forming the mixture by mixing the boehmite material and a compound of at least one structural stabilizer;
b) drying the mixture to form a dried mixture, wherein the dried mixture comprises the boehmite material and the compound of the at least one structural stabilizer; and
c) calcining the dried mixture to form the stabilized support.

57. The process according to claim 56 wherein the compound of the at least one structural stabilizer includes a salt of the at least one structural stabilizer, an acid of the at least one structural stabilizer, an oxide of the at least one structural stabilizer, or combinations thereof.

58. The process according to claim 56 wherein forming the mixture of step a) further comprises dispersing the boehmite material in a solvent to form a sol and adding the compound of the at least one structural stabilizer to the sol.

59. The process according to claim 56 wherein forming the mixture of step a) further comprises dispersing the compound of the at least one structural stabilizer in a solvent to form a sol and adding the boehmite material to the sol.

60. The process according to claim 56 wherein forming the mixture of step a) further comprises dispersing the boehmite material in a first solvent to form a first sol, dispersing the compound of the at least one structural stabilizer in a second solvent to form a second sol or solution, and combining the first sol with the second sol or solution.

61. The process according to claim 56 wherein step b) further comprises: (1) treating the dried mixture to form a dried mixture comprising a partially-stabilized support; and (2) applying a portion of the at least one structural stabilizer to the dried mixture comprising the partially-stabilized support to form a dried mixture comprising a support precursor, and wherein the dried mixture of step c) comprises the dried mixture comprising the support precursor.

62. The process according to claim 56 wherein the method for preparing the catalyst support further comprises d) applying an additional amount of a structural stabilizer to the stabilized support.

63. The process according to claim 62 wherein the structural stabilizer applied in step d) is the same as the at least one structural stabilizer used in step a).

64. The process according to claim 62 wherein the structural stabilizer applied in step d) is different than the at least one structural stabilizer used in step a).

65. The process according to claim 1 wherein the stabilized support has an enhanced hydrothermal stability, and the method for making the stabilized support with enhanced hydrothermal stability further comprises:
forming the mixture by dispersing the boehmite material in a solvent to form a sol;
drying the sol to form a dried boehmite; and
depositing a compound of a structural stabilizer to the dried boehmite to form the mixture, wherein the mixture comprises boehmite and the compound of the structural stabilizer.

66. The process according to claim 65 wherein the sol has a total sol weight, and wherein the sol has a solid content of from about 20% to about 40% by weight of the total sol weight.

67. The process according to claim 65 wherein the depositing step is accomplished by impregnation, precipitation, or chemical vapor deposition.

68. The process according to claim 65 wherein the depositing step is accomplished by impregnation.

69. The process according to claim 65 wherein the boehmite material is calcined at a temperature between about 250° C. to about 350° C. before depositing the compound of the structural stabilizer.

70. The process according to claim 65 wherein the method for preparing the stabilized support with enhanced hydrothermal stability further comprises forming the mixture by mixing a boehmite sol and a gel containing at least one structural stabilizer in the form of an inorganic oxide.

71. The process according to claim 70 wherein the gel is formed by precipitating an inorganic oxide or co-precipitating at least two inorganic oxides.

72. The process according to claim 70 wherein the gel comprises precipitated alumina, silica, titania, zirconia, magnesia, boria, ceria, thoria, or combinations thereof.

73. The process according to claim 70 wherein the gel comprises a co-precipitated silica-alumina gel.

74. The process according to claim 70 wherein the at least one structural stabilizer comprises an inorganic oxide selected from the group consisting of silica, alumina, titania, zirconia, magnesia, boria, ceria, thoria, and combinations thereof.

75. The process according to claim 70 wherein the at least one structural stabilizer comprises at least two elements, with one element having more acidity than the other or others.

76. The process according to claim 1 wherein the stabilized support is non-dispersible in water or an aqueous solution which comprises an active metal compound.

77. The process according to claim 1 the stabilized support further includes another structural stabilizer which comprises at least one element selected from the group consisting of tungsten (W), tantalum (Ta), niobium (Nb), thorium (Th), germanium (Ge), uranium (U), tin (Sn), antimony (Sb), vanadium (V), halfnium (Hf), sodium (Na), potassium (K), boron (B), magnesium (Mg), aluminum (Al), silicon (Si), calcium (Ca), titanium (Ti), chromium (Cr), manganese (Mn), iron (Fe), cobalt (Co), nickel (Ni), copper (Cu), zinc (Zn), gallium (Ga), strontium (Sr), zirconium (Zr), barium (Ba), thorium (Th), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), oxides thereof, and combinations thereof.

* * * * *